(12) United States Patent
Wan (10) Patent No.: US 10,323,924 B2
(45) Date of Patent: Jun. 18, 2019

(54) STEP-SCANNING SENSING BEAM FOR IMAGING INTERFEROMETER

(71) Applicant: Xiaoke Wan, Fairfax, VA (US)

(72) Inventor: Xiaoke Wan, Fairfax, VA (US)

(*) Notice: Subject to any disclaimer, the term of this patent is extended or adjusted under 35 U.S.C. 154(b) by 0 days.

(21) Appl. No.: 15/871,050

(22) Filed: Jan. 14, 2018

(65) Prior Publication Data

US 2018/0238675 A1    Aug. 23, 2018

Related U.S. Application Data

(60) Provisional application No. 62/447,962, filed on Jan. 19, 2017.

(51) Int. Cl.
*G01B 9/02* (2006.01)
*G01B 11/14* (2006.01)

(52) U.S. Cl.
CPC ....... *G01B 9/0203* (2013.01); *G01B 9/02002* (2013.01); *G01B 9/02091* (2013.01); *G01B 11/14* (2013.01)

(58) Field of Classification Search
CPC ............ G01B 9/02003; G01B 9/02004; G01B 9/02005; G01B 9/02091
See application file for complete search history.

(56) References Cited

U.S. PATENT DOCUMENTS

2018/0055355 A1*   3/2018   Sarunic ................ A61B 3/1233

* cited by examiner

*Primary Examiner* — Jonathan M Hansen (57) ABSTRACT

In interferometer imaging signal acquisition using a movable optical beam to sample a target with specular or non specular reflecting surfaces or internal features, beam moving during interferometer signal acquisition can generate unwanted phase error due to shifting speckle field. Examples include coherent LIDAR, Interferometry Doppler sensing and optical coherence tomography. During an interferometer signal acquisition period, an interferometer sensing beam can be substantially stationary, and active step-scanning can be synchronized with interferometer signal acquisition cycles. For interferometers using repetitive chirping lasers, passive dispersive counter-scan mechanisms can be used to assist step-scanning operation.

20 Claims, 7 Drawing Sheets

STEP-SCANNING SENSING BEAM FOR IMAGING INTERFEROMETER

FIELD OF THE INVENTION

The present invention relates to apparatus and method of sensing beam scanning of general imaging interferometers.

BACKGROUND OF THE INVENTION

Various interferometer applications sense scattering field, so the interference signal comprises the coherent contribution of many scattering speckles, which in general are random in phase and magnitude. Examples include coherent LIDAR ranging, Interferometry Doppler sensing and optical coherence tomography (OCT). In these examples, a single-point or single line-of-sight sensing can be naturally extended to a higher dimensional imaging application, by incorporating lateral beam scanning such as a raster scanning pattern. In imaging applications, the beam scanning range is typically large enough to cover more than ten resolvable beam spots and more than ten interferometer measurements are made. A standard beam scanning mechanism shifts a sensing beam continuously, resulting in a continuously changing scattering field during an interferometer signal acquisition period. Two image degradation issues may arise when a sensing beam moves continuously: spatial resolution and interferometer measurement precision.

The spatial resolution degradation is easy to understand. For example, if a circular beam spot shifts at a constant speed of one beam diameter per signal acquisition period, the resulted spatially resolvable spot becomes an oval shape, approximately two beam diameters in the scanning direction and one beam diameter in the orthogonal direction. The spatial resolution is worsened along the beam scanning direction and the asymmetry of the resolvable spot is often undesirable as well.

Continuous beam scanning introduces an arbitrary phase transition of a sensed speckle field during a signal acquisition period, which consequently increases interferometer measurement errors. Static speckle noise has been observed and studied extensively. For example, in a coherent LIDAR, the precision of distance measurements is typically limited by static speckle noise which is comparable to the surface roughness of a sensed target. The study of scanning speckle error is a relatively new. When the optical sensing beam remains stationary to the scattering field during a signal acquisition period, the scanning speckle error is zero. Baumann et al. published in "Comb-calibrated frequency-modulated continuous-wave ladar for absolute distance measurements," Optics Letters 38, (2013), and proved that the scanning speckle error of a frequency modulated continuous-wave (FMCW) was statistically proportional to a dimensionless lateral beam scanning speed. The dimensionless scanning speed could be defined as the beam displacement during an interferometer signal acquisition period per resolvable beam width along the scanning direction. In a typical imaging application, it is reasonable to set the dimensionless scanning speed in the range of 0.2 to 2, and consequently, a scanning speckle error can be often found to be a dominating error source. Baumann did not teach any beam scanning methods to reduce the scanning speckle error in imaging applications. Thorpe disclosed a dual-chirped-laser coherence LIDAR in US Patent Publication Number US 2016/0123720 A1, that the scanning speckle range error could be reduced or removed by sharing a common sensing beam path with two chirped laser beams, and the wavelength chirping could be in a same direction or in opposite directions. However, this dual-chirped-laser technique is not capable of reducing a Doppler error caused by scanning speckle. Additionally, the increased complexity of signal processing of the dual-chirped-laser technique can be undesirable. For instance, the sensor data refreshing rate can be compromised if the computation power is limited. Thorpe mentioned that optical phase-sensitive detection techniques such as low-coherence interferometry, OCT and laser radar could face unique challenges in measuring diffusely scattering surfaces due to speckle. Thorpe's this statement did not teach beyond the familiar scope of static interferometer speckle. Neither Baumann nor Thorpe evaluated the effect of scanning speckle error on interferometers other than FMCW LIDAR measuring distance or displacement. Even for the dual-chirped laser LIDAR, which is capable of measuring Doppler shift in additional to distance, Thorpe did not mention the Doppler error caused by scanning speckle. It can be unobvious to extend the teaching of scanning speckle error in LIDAR distance measurement to some other interferometer measurements or some other types of interferometers.

Michie disclosed a step-scan weather radar in U.S. Pat. No. 5,392,048. Such a radar could certainly be an interferometer type. Acquiring interferometer data over a certain period, such an interferometer or another interferometer in general could make one measurement such as distance, or a set of measurements including, e.g., distance, velocity and signal strength. The step-scan mode could be automatic raster scan with continuous beam scanning in one direction and incremental beam steps between continuous scanning lines. The beam positioning could be operated as a selective mode to skip areas between regions of interest. Essentially, the interferometer could make a series of interferometer measurement in one area to form a set of sub-images while the beam continuously moved, and the interferometer could step to a next area to acquire another set of sub-images. Although continuous beam scanning can have obvious advantages with fewer interruptions, Michie taught that a disrupted scanning mode can have unique advantages worth the trade-off. However, Michie did not teach a repetitive step scanning mode allowing an interferometer to acquire signal under stationary beam condition. For common interferometers producing effective and efficient measurements, it can be much more complicate or difficult to operate such a step-scanning mode than run a continuous scanning mode. Furthermore, it can be extremely challenging to speed up such a step-scanning mode to 1 kHz or higher. A step-scanning operation obviously needs a strong incentive to offset the disadvantages. Improving on the previously described spatial resolution degradation might not serve as a strong incentive.

Relating to Michie's teaching, an interferometer can certainly idle at one sensing beam position and later move to a different position. A person can possibly teach an interferometer operation like this: holding a sensing beam stationary relative to a target at a first beam position while acquiring signal for two or more sets of interferometer measurements; moving the beam to a second position to acquire interferometer signal for one or more interferometer measurement sets and so on so forth. Although data averaging at the first beam position has little effects on static speckle noise, data averaging could reduce some other noise such as instrument noise. Even without knowing how relevant a scanning speckle error is, this person might also point out the absence of scanning speckle error because of the stationary beam. However, it is not obvious to extend this teaching to an effective and efficient imaging strategy. For instance, if the step size between the first position and the second portion is either smaller than 0.2 or bigger than 2 times the resolvable beam width, the beam sampling can be viewed as inefficient or ineffective for image forming. Also, it might not be viewed a meaningful imaging strategy to sample fewer than 10 beam positions or cover a range less than 10 resoluble beam widths. In addition, acquiring redundant periods of data at the first beam position can be undesirable for low efficiency in term of time expense. Similarly, it can be inefficient to make only one set of interferometer measurements at the first beam position, while two or more sets of measurements can potentially be made with the same quality. It can be either redundant or inefficient to spend twice or longer time at one beam position than at another beam position. Although it can be necessary to have a beam transition period between two beam positions, it can be inefficient to have a transition time longer than the signal acquisition time at either beam position. Therefore, many instrument operation modes can be distinctive from an effective and efficient step-scanning interferometer imaging strategy.

Ngoi pointed out in U.S. Pat. No. 6,271,924 that speckle noise was a significant noise source in Doppler vibrometer measurement. Ngoi also suggested that by adjusting the speed of continuous scanning, the measurement precision could be affected. Ngoi's definition of "scanning speed" lacked an important variable of sensing beam width at a target plane. Nevertheless, inspired by Ngoi's teaching, one might be able to experiment vibrometer precision as a function of "scanning speed" or become aware of a precision advantage at an as low as possible "scanning speed". However, there are still two problems at a practical low continuous scanning speed: 1, oversampling pays for a heavy penalty of reducing image refreshing rate, and 2, the scanning speckle error can be significant even at a low scanning speed. Ngoi's vibrometer used an acoustic-optical-deflector (AOD) beam scanner. An AOD is capable of moving and stopping a beam within typically 1 µs, potentially offering a temporal window with a stationary beam and then quickly opening another window at a different beam location. Ngoi did not teach a step-scanning and measurement strategy for imaging an extended area.

SUMMARY OF THE INVENTION

Embodiments of the present invention may address the above-mentioned problems and limitations, among other things. The general approach is described as step-scanning sensing beam moving synchronized with interferometer signal acquisition cycles; i.e., the function of interferometer signal acquisition occurs when beam moving speed is low and the function of sensing beam moving occurs when the signal acquisition function can be omitted. The sensed target in general is a scattering object, meaning that the collected optical signal in general does not follow a single specular reflection model or a model with a small number of specular reflections. In surface sensing applications, the collected optical signal from a scattering target can suffer from substantial phase scrambling, and the phase variation among scattering speckles approaches or exceeds $2\pi$. Because of the phase scrambling, the signal contrast of an interference signal in general is much lower than 10%. In volumetric applications where multiple scattering occur at different depths, the collected optical signal at a scattering depth can suffer from substantial phase scrambling, and the phase variation of the scattering speckles approaches or exceeds $2\pi$.

One embodiment describes an interferometer comprising a device moving a sensing beam with a synchronized step-scanning waveform to image a scattering target. The sensing optical beam remains substantially stationary relative to the target during an interferometer signal acquisition period, and the beam switches position during a transition time between two adjacent signal acquisition periods. The interferometer efficiently use the entire acquired data during an acquisition period to produce at least one set of interferometer measurements to represent the overall status of the interferometer system including the target. A favorable step-scanning beam displacement waveform can meet the following specifications: during a data acquisition period, the beam displacement is less than 0.5 times of the resolvable beam width along the stepping direction; the beam transmission step size is in the range of 0.2 to 2 times resolvable beam width; the number of steps is larger than 10; the entire beam displacement range is larger than 10 resolvable beam widths; a beam transition time is shorter than the shortest signal acquisition period; the longest signal acquisition period is shorter than 2 times of the shortest signal acquisition period.

Because of high acceleration and deceleration associated with step-scanning actions, it is very challenging to use a standard mechanical beam scanning device such as a scanning mirror or a translation stage to support a measurement refreshing rate approaching 1 kHz. At an interferometer data refreshing rate higher than 1 kHz, multiple sensing beams can be simultaneously used. At a high interferometer data refreshing rate higher than 1 kHz, a fast beam moving device such as an Acoustic-optical-deflector (AOD), a MEMS device, a Piezo device or a rotating polygon mirror can be used in a preferred embodiment.

It might be challenging to support a large beam moving range with merely one fast beam moving device. In another embodiment, a second beam moving device such as a scanning mirror can be combined to step-scan a beam over a large range. Essentially, the scanning mirror scans at a constant speed, while the faster scanning device repetitively holds the beam stationary with small counter-scanning.

Another embodiment describes a passive step-scanning mechanism which is particularly suitable for an interferometer employing a linearly chirped laser. A passive dispersive element such as a grating produces a linear counter-beam-scanning during a signal acquisition period in which the optical frequency varies linearly. Combining the dispersive element with a standard constant speed beam moving device such as a scanning mirror, the effective beam scanning waveform becomes a step function.

Another embodiment describes a passive step-scanning mechanism for an interferometer employing two linearly chirped lasers sharing a common sensing beam path. A pair of passive dispersive elements can separately provide an equal amount of counter-scanning for the corresponding chirped lasers. The directions of dispersion can be arranged accordingly when the two lasers chirp either in a same direction or the opposite directions.

DETAILED DESCRIPTION

Scanning speckle error can be an issue in many types of interferometers. A scanning speckle error is essentially a temporal phase error associated with a temporal speckle field shift. Not all interferometers sensitive to phase shift have the scanning speckle issue. For example, an interferometer integrating time domain signals to exploit spatial phase information might not have a similar scanning speckle problem. Therefore, only interferometers sensitive to temporal phase shift are affected by scanning speckle error.

In an example of Swept-source OCT interferometer, scanning speckle error affects the precision of measuring the distance of a scattering feature just like in an FMCW LIDAR.

Figure 1:
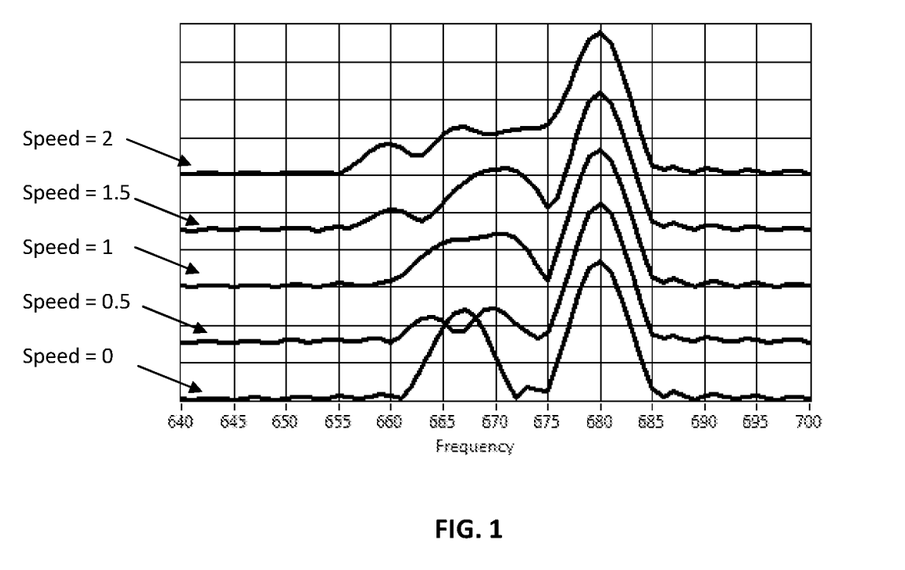
FIG. 1 illustrates simulated OCT spectra of a thin scattering layer under a specular reflecting plane with various sensing beam scanning speed settings.

However, it is not obvious how scanning speckle error affects depth resolution, a much more concerned aspect than a length metrology aspect in OCT. In FIG. 1, simulated sweep-source OCT spectra with various beam scanning speeds are stacked over each other to illustrate the deteriorating signal quality caused by continuous beam scanning. When a sensing beam is stationary (speed=0), FIG. 1 illustrates a spectral lobe on the left side representing a thin scattering layer, and a second spectral lobe on the right side representing a specular reflecting plane above the scattering layer. A random speckle pattern was generated to simulate the scattering field. A Gaussian optical beam was simulated to sense the scattering field, and constant beam moving speeds are used to generate the interferometer signals. When the sensing beam is stationary relative to the speckle field, FIG. 1 shows that the spectrum of the scattering layer typically appears Fourier transform limited, just like the spectrum of the reflecting plane. The depth resolution is essentially determined by the optical tuning range of the sweep source. When the beam moving speed is no longer zero, a typical scattering spectrum broadens and deforms while the reflecting spectrum is unchanged. The spectrum broadening and deformation in general become increasingly worse at higher moving speeds, and it is increasingly more difficult to resolve the scattering feature from the reflecting feature. FIG. 1 also helps to illustrate that the length measurement error of an OCT or an FMCW LIDAR increases along with a higher beam scanning speed. A peak location of a spectral lobe can correspond to a distance measurement. When a spectrum broadens or deforms, the accuracy of peak finding becomes worse. I herein demonstrate clearly the disadvantages of continuous beam scanning and scanning at higher speeds in OCT. It would be obvious to one of the ordinary skill in the art that these disadvantages can be elaborated with more details, e.g., statistically quantifying the spectral broadening as a function of scanning speed. The prior art of OCT lacks similar teaching.

In a Doppler sensing interferometer, a Doppler shift measurement is proportional to a rate of temporal phase change. A scanning speckle resulted phase change is in general proportion or scanning speed. I herein state that scanning speckle resulted Doppler error in general is proportional to beam displacement per resolvable width per second.

Figure 2:
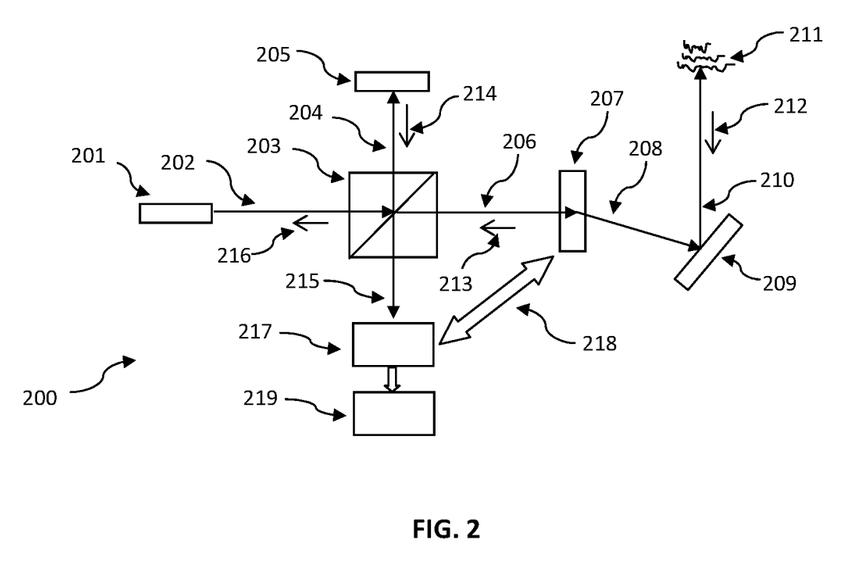
FIG. 2 illustrates an interferometer with step-scanning mechanism synchronized with interferometer signal acquisition cycles.

FIG. 2 illustrates an exemplary embodiment of an interferometer 200 comprising a step-scanning mechanism synchronized with the signal acquisition cycles. An optical source 201 transmits a beam 202 toward an interferometer beamsplitter 203 and splits into two beams, with the first beam 204 directing toward a reference feedback device 205, and the second beam 206 directing toward a first beam moving device 207 (illustrated as a beam steering device). The steered beam 208 is redirected by a second beam moving device 209 (illustrated as a beam steering mirror as well), and the reflected beam 210 transmits out from the interferometer 200 to sense a scattering target 211. At the target location, the sensing beam has a resolvable beam width along the beam moving direction. A sensor feedback beam 212 includes the coherent contribution from a large number of scatters of the target at different distances from the interferometer, so the beam 212 in general suffers from a substantial phase scrambling. Nevertheless, the sensor feedback beam carries information about the target such as distance and velocity. The beam 212 becomes beam 213 after the redirection of the beam moving devices 209 and 207. The reference device 205 (illustrated as a simple reflector) produces a feedback beam 214 which combines with the beam 213 at the interferometer beamsplitter 203 to form interference optical beams 215 and 216. One interference beam 215 is collected by a signal acquisition device 217. A hardware or software synchronizer 218 synchronizes the beam moving action and the signal acquisition function. A signal processing device 219 makes a set of interferometer measurements from the acquired interferometer signal.

Figure 3:
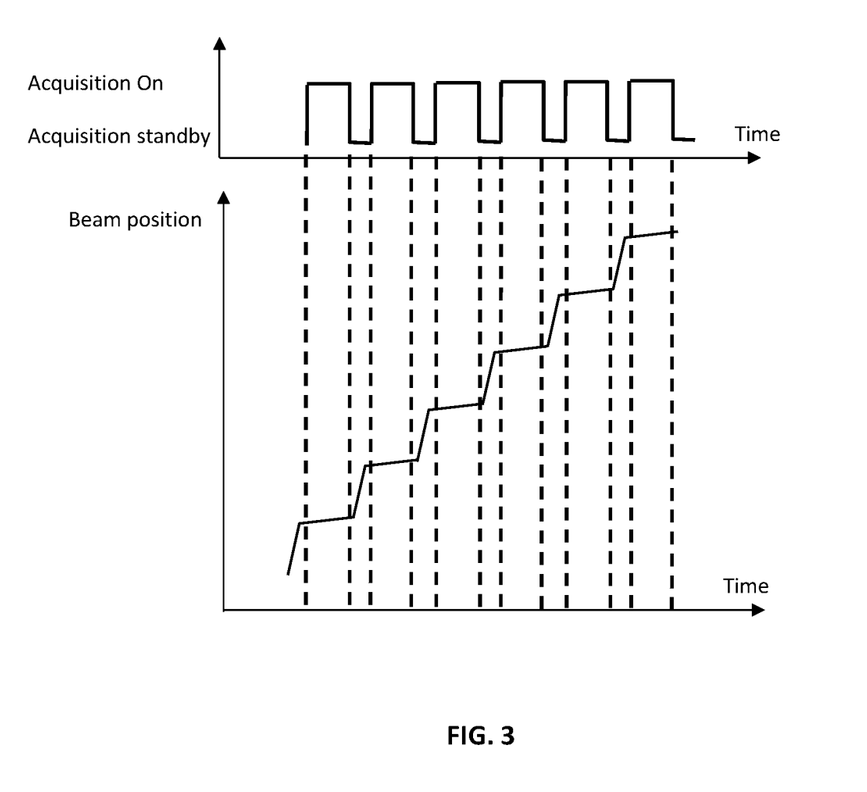
FIG. 3 illustrates a stepping beam-position waveform synchronized with data acquisition cycles.

The second beam moving device 209 can be stationary all the time, so the first beam moving device 207 is solely responsible for moving the beam. Shown in FIG. 3, a beam displacement waveform generated by the beam moving device 207 can be preferably as close to a step function as possible. A less perfect step-scanning waveform can be assessed by dividing the waveform into alternating low speed periods and high speed periods. The vertical dash lines in FIG. 3 show an example of such speed division. The signal acquisition device can operate in a repetitive on-standby-on manner synchronized to the beam stepping cycles, with a duty cycle essentially determined by the division of high and low speed periods. For example, the duty cycle is 90% if the mean value of low speed periods is 9 times the mean value of high speed periods. A speed reduction merit function can quantify the beam moving speed during essential interferometer signal acquisition relative to the overall beam moving speed. For example, if the mean displacement in high speed periods is 9 times the mean displacement in low speed periods, the speed reduction merit function is 10%. A lower speed reduction merit function can be more advantageous; e.g., a perfect step-function can yield 0%. With a speed merit of <50%, a less perfect step-scanning waveform in theory can remain advantageous over a constant speed waveform as long as the duty cycle is >50%. It can be advantageous to operate the beam moving and signal acquisition cycles strictly repetitive, i.e., with constant frequency, duty cycle and beam displacement magnitudes. When the division of high and low speed periods are not strictly repetitive, median values can be more advantageous to assess the merits of an arbitrary beam scanning waveform than using mean values. It can be further advantageous to limit the median beam displacement in low speed periods to <0.5 resolvable beam width at the target location, and the median beam displacement in high speed periods in the range of 0.2 to 2 resolvable beam widths. To form a proper image of the target, the entire beam moving range along the moving direction can be more than 10 resolvable beam widths and the number of low speed periods can be more than 10. It can be advantageous to scan the beam along a straight line or a smooth curve. Although a beam hopping back and forth in theory can still create a perfect step-sampling pattern, in practice it is advantageous to have all beam moving increments along a substantially same direction.

The signal processing device 219 of the exemplary interferometer can be configured to produce various measurements by applying various modulation and demodulation configurations of the light source, reference feedback and signal acquisition. Because a scanning speckle error behaves like a temporal phase shift, any interferometer measurements sensitive to a temporal phase shift or frequency shift of the sensor feedback beam 212 can benefit from the present invention of synchronized step-scanning. For example, in a coherent LIDAR that the optical source 201 can be a linearly chirped laser, such that the distance from the target to the interferometer can be measured from the interferometer signal. The light source 201 can be a single wavelength laser, and the reference feedback device can produce a feedback beam 214 with a series of spatial or temporal phase steps, such that a phase shift or a Doppler shift of the target can be measured. The reference feedback device can include an optical frequency modulator, such that the phase shift or Doppler shift of the target can be measured with a frequency demodulator in the signal acquisition or signal processing. There can be free space or fiber optics delay lines along the reference or sensing beam path. Polarization rotation of the sensor feedback beam 212 can be measured with proper polarization modulation and demodulation techniques. The measured dimension, phase shift, frequency shift or polarization rotation can be further converted to useful information such as shape, velocity, vibration, temperature, strain, sound speed and other mechanical properties.

Redundant or low efficient data acquisition can be avoided. To demonstrate an efficient operation, the interferometer signal acquisition device can continuously acquire signal over a low speed period, and the signal processing device can use the entire acquired signal to produce one and no more than one set of interferometer measurements, which represent the overall status of the system including the target during the low speed period. Furthermore, over the entire beam scanning region of more than 10 beam locations, the signal processing device makes consistent measurements for all locations.

The exemplary interferometer is a basic Michelson interferometer. However, as it would be obvious to one of the ordinary skill in the art that the synchronized step-scanning mechanism can be implemented for many other types of two-arm or multiple-arm interferometers sensing specular or non-specular reflecting targets. Any of the reflecting surfaces of the interferometer 200 can be highly reflective, partially reflective, polarization-dependent or wavelength-dependent reflective (e.g. a grating surface). Any of the optical components can be in bulk optics, fiber optics or wave guide. The beamsplitter can employ a grating as the splitting surface, and it can split or combine one or more beams into more than two beams.

For an interferometer system producing high measurement refreshing rate approaching or exceeding 1 kHz, redundancy or low efficiency issues can be more tolerable in many imaging applications. At 1 kHz or higher refreshing rate, as long as the interferometer acquires interferometer signal during low speed periods, a step-scanning can be distinctive from other instrument operation even if the effectiveness or efficiency are not optimal. Unfortunately, a standard mechanical beam moving device such as scanning mirror and moving stage is typically not designed to support high frequency step-scanning operation. When the signal acquisition refreshing rate approaches or exceeds 1 kHz, the first beam moving device 207 can be an AOD, a MEMS device, a Piezo device or a high speed rotating polygon mirror. Alternatively, an interferometer can illuminate multiple discrete sensing beams to sample a target simultaneously, such that a slow moving device 207 can still support a 1 kHz system refreshing rate. Both of the beam moving devices 207 and 209 can have a beam translation mechanism. In a beam translation mode, the entire body or a portion of the interferometer 200 can laterally translate relatively to the target, or a target-carrying translation stage can translate relative to a fixed interferometer. A beam translation can be a linear translation or a translation along a smooth curve, e.g., stage rotation. The second beam moving device 209 can be a single-axis beam-scanning or beam-translating device, and the plane of beam motion can be in an arbitrary direction relative to the beam moving plane of the device 207. The second beam moving device 209 can have multiple beam-scanning or beam-translating axes.

It would be obvious to one of ordinary skill in the art of low-coherence interferometer or OCT, that the optical source 201 can be a wideband light source or a wavelength tunable source, and the signal acquisition and processing devices 217 and 219 can include an optical or electrical spectrum analyzer. An optical spectrum analyzer can be a spectrometer based on a dispersive grating or prism, a Fourier Transform Spectrometer or a tunable filter based spectrometer.

If an AOD is used as a said first beam moving device, this AOD shifts the optical frequency of the sensing beam by typically 100 MHz. When a sensor feedback beam travels back through the AOD again, the optical frequency is further shifted. Moreover, this optical frequency shift changes whenever the AOD steers a beam to a different angle. This varying high frequency shift can create difficulties for signal acquisition and processing. In U.S. Pat. No. 6,271,924, Ngoi taught a method to shift the reference beam with an identical AOD to compensate the optical frequency shift of the sensor feedback beam. In fact, the reference beam can share the same AOD of the first beam moving device as well. Furthermore, the AOD can be placed between the light source and the interferometer beamsplitter just like moving the steering device 207 left to the beamsplitter 203 in FIG. 2. The reference feedback device 205 can have a retro-reflecting mechanism to accommodate an AOD diffracted reference beam over a wide range of diffraction angle. A concave mirror or a lens and mirror combination can provide the retro-reflecting mechanism. The reference or the sensing beam path can have a fiber optics delay line.

In the previous embodiment, the second beam moving device 209 does not produce essential function, so it can be omitted.

In another embodiment, the second beam moving device 209 is activated to extend the beam moving range of the interferometer. The first beam moving device 207 can support a high beam acceleration and deceleration for step-scanning, but the beam moving magnitude can be small. A standard scanning mirror, translation stage or rotation stage with a larger moving range is suitable for the second moving device. The first beam moving device 207 can operate in a saw-tooth waveform synchronized with the signal acquisition clock, while the second beam steering device 209 can operate in a linear waveform. Summing these two individual waveforms, a step-function waveform can be produced by matching the counter-scanning speed of the first beam moving device to the constant speed of the second beam moving device. A triangular waveform, sinusoid waveform or another similar waveform can be alternative to the saw-tooth waveform without departing from the spirit or scope of this invention.

When two active beam steering devices present in a system, a beam walking issue may arise because the resulted sensing beam position can behave more complicatedly than merely summing two individual beam moving components. The distance between the two steering devices, the beam landings on the steering devices and the beam steering axes can be configured to optimize the step-scanning aspect. Illustrated as an example in FIG. 2, the first beam steering device 207 producing less steering magnitude can be arranged between the optical source 201 and the second beam steering device 209 producing a larger steering magnitude. Additionally, it can be advantageous to reduce or optimize the distance between a beam steering axis and the corresponding beam landing; it can be advantageous to reduce or optimize the distance between the beam landings on the steering devices; it can be advantageous to reduce or optimize the distance between the scanning axes.

Figure 4:
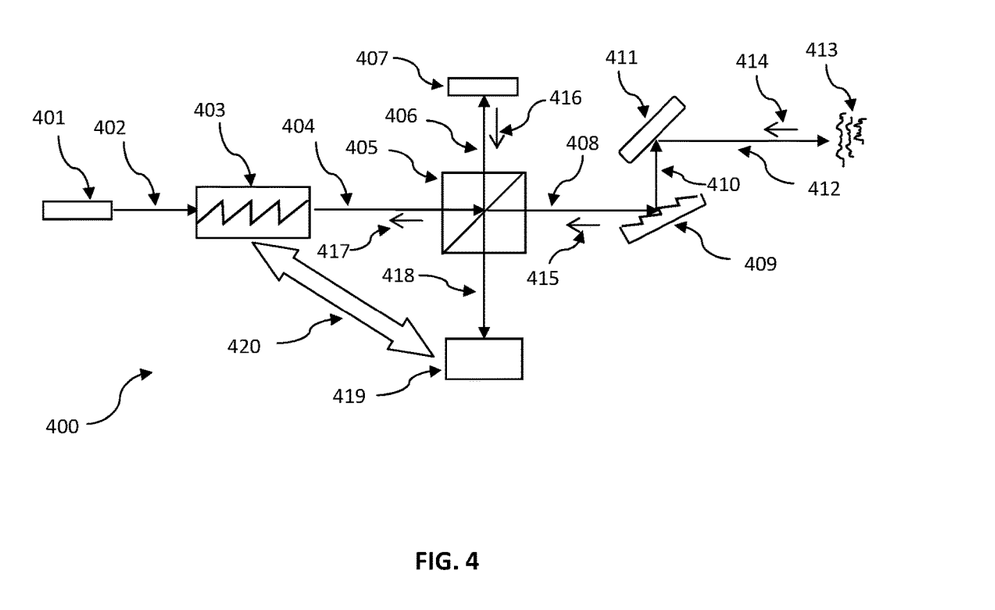
FIG. 4 illustrates that the combination of laser linearly chirping and a dispersive element produces a passively synchronized counter-scanning mechanism.

FIG. 4 illustrates an exemplary embodiment of an interferometer 400 including a passive step-scanning mechanism synchronized with the signal acquisition cycles. A laser source 401 transmits a beam 402 toward a laser wavelength modulator 403, and the modulated beam 404 transmits to a beamsplitter 405 and splits into two beams, with one beam 406 directing toward a reference feedback device 407, and the other beam 408 directing toward a dispersive element 409 (illustrated as a reflecting dispersive grating). The dispersed beam 410 transmits toward a linear beam moving device 411 (illustrated as a steering mirror), and the deflected beam 412 transmits out from the interferometer 400 to sense a target 413. A sensor feedback beam 414 carries information of the target such as distance and velocity. The beam 414 is redirected by the beam moving device 411 and the dispersive element 409 toward the beamsplitter 405. The reflected beam 416 from the reference feedback device 407 combines with the beam 415 at the beamsplitter 405 to form interference optical beams 417 and 418. One interference beam 418 is collected by a signal acquisition device 419. The signal acquisition device operates in a repetitive manner, and a synchronizer 420 synchronizes the signal acquisition cycles with wavelength modulation cycles.

Figure 5:
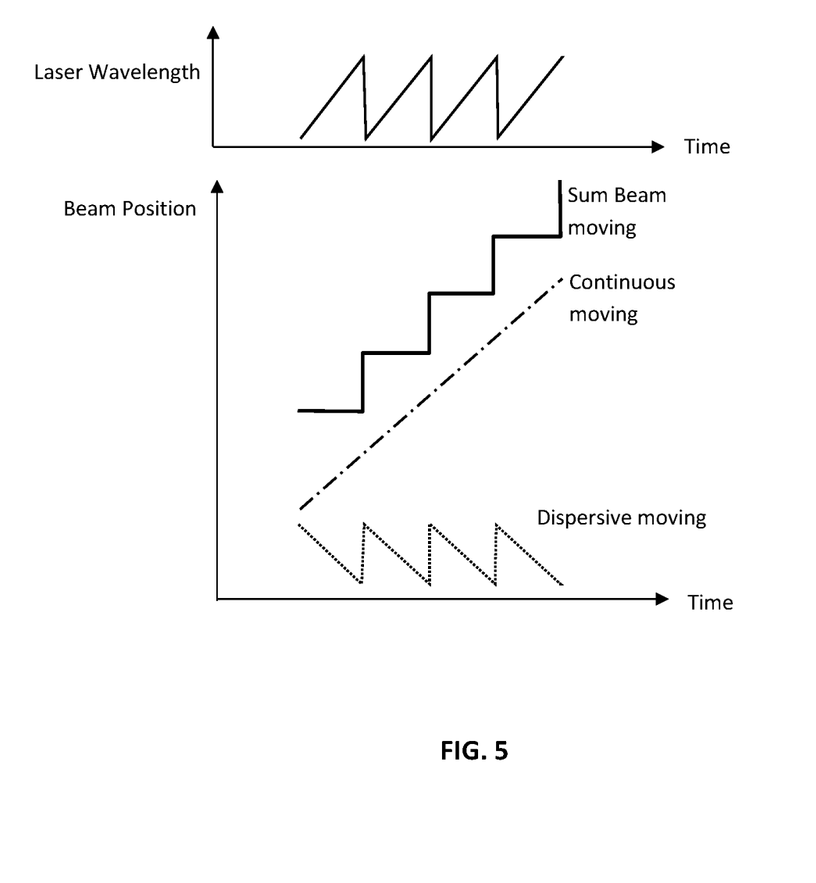
FIG. 5 illustrates a step-scanning waveform synchronized with laser chirping cycles, applying the combination of a continuous mirror scanning and repetitive dispersive counter-scanning.

FIG. 5 illustrates that the resultant beam position of beam 412 can be a step function waveform at the target location. The laser modulation cycles can follow a saw-tooth waveform, so the disperse angle of the dispersive element 409 is substantially a saw-tooth waveform as well. The beam displacement contribution of the beam moving device 411 is substantially a linear waveform, and the beam moving plane is parallel to the dispersion plane. By matching the parameters of laser chirp rate, dispersion power and linear beam moving speed, the resultant beam displacement can be substantially a step function. Because the interferometer signal acquisition is synchronized with the laser chirping cycles, the beam moving speed can be substantially smaller during a signal-acquisition-on period than the overall beam moving speed. It can be advantageous to acquire interferometer data at more than 10 beam steps to form an image of the target. It can be advantageous to set the beam-stepping size in the range of 0.2 to 2 resolvable beam widths. A triangular waveform, sinusoid waveform or another regular waveform with or without modifications can be an alternative to the saw-tooth laser chirping waveform without departing from the spirit or scope of this invention.

Considering a simplified beam path with a diffraction-limited beam focused at the target, the beam-stepping size can be adjusted by controlling a collimated beam width at the dispersive element. In an example of dispersive grating, the number of grating lines illuminated by the beam is $W*\rho$, with W the grating intercepted beam width and $\rho$ the grating line density. At the first order dispersion, the beam-stepping size in a unit of resolvable beam width at the target can be approximately estimated as $W*\rho*\Delta\lambda/\lambda$, where $\lambda$ is the laser wavelength, and $\Delta\lambda$ is the laser wavelength chirping range.

It would be obvious to one of ordinary skill in the art that the dispersive element 409 can be a dispersive grating, a dispersive prism or an acoustic modulated Bragg grating. A grating can be reflective or transmission based. It would be also obvious that additional beam scanning or translation mechanisms can be incorporated to produce a beam scanning in multiple axes while the sensing beam can still keep substantially stationary during a signal acquisition period. It would be obvious to one of ordinary skill in the art of low-coherence interferometer or OCT that the interferometer 400 in general represents a swept-source OCT. It would be obvious to one of ordinary skill in the art of coherence LIDAR that the interferometer 400 in general represents an FMCW LIDAR.

If the second beam moving device 411 operates in a beam steering mode, a beam walking concern arises similarly to what has been described for the interferometer 200, and similar solutions can be applied to the interferometer 400. As an example shown in FIG. 4, it can be advantageous to arrange the dispersive device 409 between the optical source 401 and the beam moving device 411. For the beam walking reason and also for simplicity, it can be advantageous to integrate the two functions of dispersive beam displacement and active continuous beam displacement into one beam moving device. Rotating grating and translating grating are apparent examples. It can be further advantageous to minimize the distance between a rotating axis and the beam landing.

Dispersion compensation is a common issue in biological OCT applications, and the introduction of a dispserve beam steering device can affect the dispersion characteristics of an OCT system. Some of the methods herein described to control beam walking can compensate system dispersion as well. For example, by adjusting the distance between the rotating axis of a rotatable dispersive grating and the beam landing, the grating contributed dispersion can be minimized or optimized to compensate the system dispersion.

Figure 6:
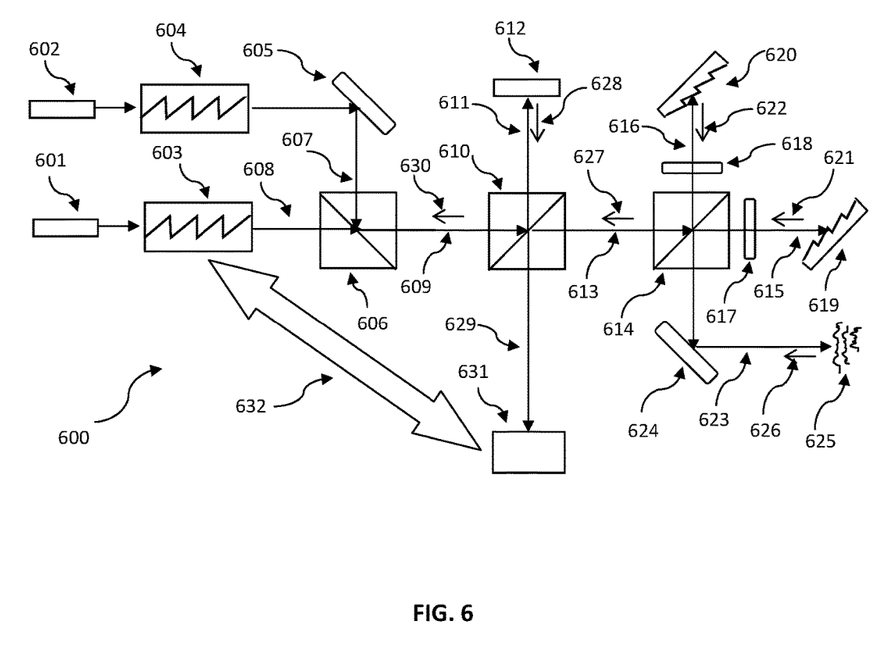
FIG. 6 illustrates that dispersive counter-scanning can be simultaneously realized for two chirped lasers sharing a common sensing beam path with a common chirping direction.

FIG. 6 illustrates an exemplary interferometer 600 including two laser sources, 601 and 602. Two laser wavelength modulators 603 and 604 modulate the laser wavelengths linearly and repetitively with the same chirping directions; i.e., during an interference signal acquisition period, both laser wavelengths increase together in a substantially linear manner, or they decrease together in a substantially linear manner. The laser modulations and setbacks are also synchronized. A beam deflector 605 and a beamsplitter 606 can be used to combine the two laser channels together into a common path. The polarization states of the optical beam 607 and beam 608 can be substantially orthogonal, and the beamsplitter 606 can be a polarization beamsplitter to provide the optimal beam combining efficiency. The combined beam 609 transmits toward an interferometer beamsplitter 610 and then splits into two beams, with one beam 611 directing toward a reference feedback device 612, and the other beam 613 directing toward a polarization beamsplitter 614 and then splitting into two beams 615 and 616. Because of high extinction ratios of the polarization beamsplitters, a substantially larger portion of the laser source 601 can route along the beam path of 615 than the beam path of 616. On the contrary, a substantially smaller portion of the laser source 602 can route along the beam path of 615 than the beam path of 616. The beams 615 and 616 transmit through waveplates 617 and 618 respectively before reaching dispersive reflectors 619 and 620 respectively. The dispersed beams 621 and 622 transmit back to the polarization beamsplitter 614 through the waveplates 617 and 618 respectively. Because of polarization rotation of the waveplates, the two beams 621 and 622 can combine into one beam 623. Redirected by a beam moving device 624, beam 623 transmits out from the interferometer 600 to sense a target 625. A sensor feedback beam 626 substantially reverses the path of beam 623. Going through reflection, beam splitting, dispersive reflection and beam combining of the components 624, 614, 617, 618, 619 and 620, the beam 626 emerges from the beamsplitter 614 and becomes a beam 627 which directs toward the interferometer beamsplitter 610. A reference feedback beam 628 from the reference feedback device 612 combines with the beam 627 at the beamsplitter 610 to form interference optical beams 629 and 630. One interference beam 629 is collected by a signal acquisition device 631. The signal acquisition device operates in a repetitive manner, and a synchronizer 632 synchronizes the data acquisition cycles with the wavelength modulation cycles.

The laser modulation waveforms of 603 and 604 can be substantially saw-tooth functions, so the disperse angles of the dispersive reflectors 619 and 620 are substantially saw-tooth functions as well. The beam moving waveform of the beam moving device 624 is substantially a linear function, and the plane of beam moving is parallel to the dispersion planes. Although the laser chirping rates of 603 and 604 in general are different, this difference can be compensated accordingly with dispersion powers of 619 and 620. Furthermore, the linear beam moving speed of the device 624 can be adjusted accordingly, so the beam displacement waveform at the target can be substantially a step function. Because the interferometer signal acquisition is synchronized with the laser chirping cycles, the beam moving speed can be substantially smaller during a signal-acquisition-on period than the overall beam moving speed.

Figure 7:
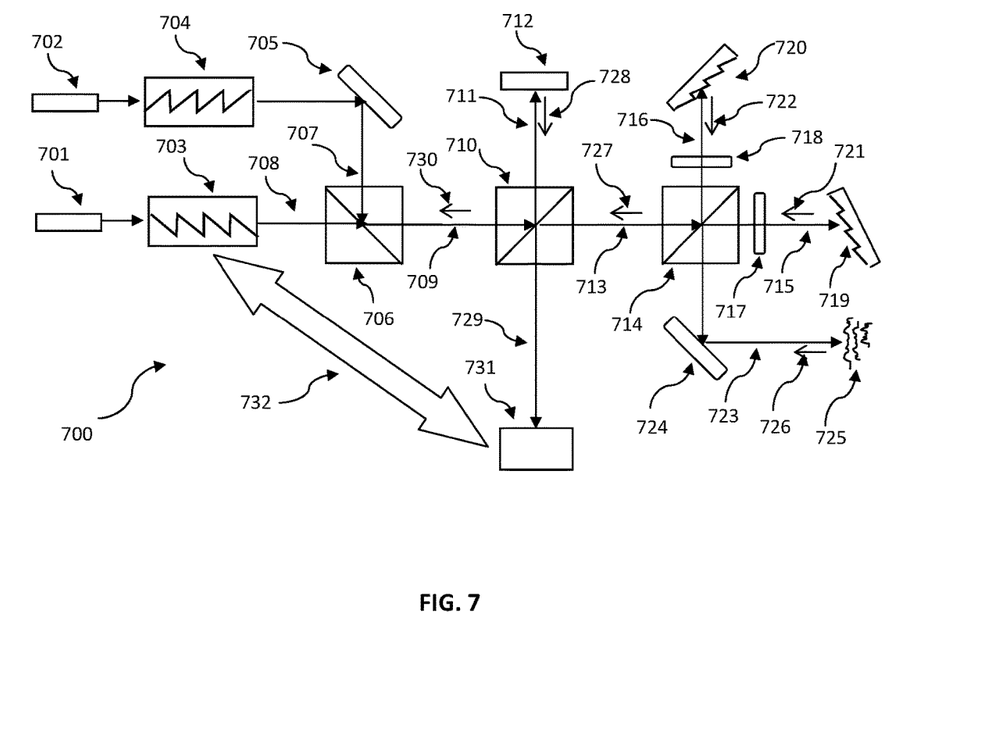
FIG. 7 illustrates that dispersive counter-scanning can be simultaneously realized for two counter-chirped lasers sharing a common sensing beam path.

FIG. 7 illustrates an examplenary interferometer 700 including two laser sources, 701 and 702. Two laser wavelength modulators 703 and 704 modulate the laser wavelength linearly and repetitively with the opposite chirping directions; i.e., during an interference signal acquisition period, one laser wavelength increases in a substantially linear manner while the other laser decreases in a substantially linear manner. The laser modulations and setbacks are also synchronized. A beam deflector 705 and a beamsplitter 706 can be used to combine the two laser channels together into a common path. The polarization states of the optical beam 707 and beam 708 can be substantially orthogonal, and the beamsplitter 706 can be a polarization beamsplitter to provide an optimal beam combining efficiency. The combined beam 709 transmits toward an interferometer beamsplitter 710 and then splits into two beams, with one beam 711 directing toward a reference feedback device 712, and the other beam 713 directing toward a polarization beamsplitter 714 and then splitting into two beams 715 and 716. Because of high extinction ratios of the polarization beamsplitters, a substantially larger portion of the laser source 701 can route along the beam path of 715 than the beam path of 716. On the contrary, a substantially smaller portion of the laser source 702 can route along the beam path of 715 than the beam path of 716. The beams 715 and 716 transmit through waveplates 717 and 718 respectively before reaching dispersive reflectors 719 and 720 respectively. The dispersed beams 721 and 722 transmit back to the polarization beamsplitter 714 through the waveplates 717 and 718 respectively. Because of polarization rotation of the waveplates, the two beams 721 and 722 can combine into one beam 723. Reflected by a beam moving device 724, beam 723 transmits out from the interferometer 700 to sense a target 725. A sensor feedback beam 726 from the target follows the reverse path of beam 723. Going through reflection, beam splitting, dispersive reflection and beam combining of the components 724, 714, 717, 718, 719 and 720, the beam 726 emerges from the beamsplitter 714 and becomes a beam 727, directing toward the interferometer beamsplitter 710. A reference feedback beam 728 from the reference feedback device 712 combines with the beam 727 at the beamsplitter 710 to form interference optical beams 729 and 730. One interference beam 729 is collected by a signal acquisition device 731. The signal acquisition device operates in a repetitive manner, and a synchronizer 732 synchronizes the data acquisition cycles with the wavelength modulation cycles.

The laser modulation waveforms of 703 and 704 are substantially saw-tooth functions synchronized in reverse ramping directions. Because the dispersive elements 719 and 720 can be arranged anti-symmetrically relative to the splitting plane of the beamsplitter 714, the disperse angles of the dispersive reflectors 719 and 720 are substantially saw-tooth functions and they can support a common beam steering direction once beams 721 and 722 combine. The beam moving waveform of the beam moving device 724 is substantially a linear function, and the plane of beam moving is parallel to the dispersion planes. Although the laser chirping rates of 704 and 705 in general are different, this difference can be compensated accordingly with dispersion powers of 719 and 720. Furthermore, the linear beam moving speed of the device 724 can be adjusted accordingly, so the beam displacement waveform at the target can be substantially a step function. Because the interferometer signal acquisition is synchronized with the laser chirping cycles, the beam moving speed can be substantially smaller during a signal-acquisition-on period than the overall beam moving speed.

What is claimed is:
1. An apparatus of transversely step scanning an interferometer sensing beam comprising:
a light source;
a beamsplitter splitting the light source into a reference beam and a sensing beam;

a beam-moving device moving the sensing beam transversely;

a transmitting aperture transmitting the sensing beam out of the apparatus and projecting a beam spot at a target location, with a resolvable beam width along the beam-moving direction;

a receiving aperture collecting a feedback beam from the target location;

a beam combining device combining at least a portion of the reference beam and at least a portion of the feedback beam to form an interferometer signal;

a signal acquisition device acquiring the interferometer signal;

an interferometer controlling function programming the beam-moving cycles and the signal acquisition cycles, alternating a high beam-moving speed period and a low beam-moving speed period for multiple consecutive beam-moving cycles, limiting a median beam displacement in low speed periods to less than 0.5 resolvable beam width at the target location, limiting the median beam displacement in high speed periods in the range of 0.2 to 2 resolvable beam widths, maintaining the beam displacements in high speed periods substantially along the same direction, acquiring the interferometer signal during a low beam-moving speed period, and repeating the signal acquisition for at least 10 consecutive beam-moving cycles;

an interferometer signal-processing device processing a period of acquired interferometer signal and producing a set of interferometer measurements, repeating the data processing for multiple acquired periods of signal, mapping at least 10consecutive beam locations with corresponding interferometer measurements.

2. The apparatus of claim 1 wherein said beam-moving cycles has a repetition rate of higher than 1 kHz.

3. The apparatus of claim 1, where the apparatus further comprises:

a target comprising a substantially scattering area at the target location, being illuminated by the sensing beam, substantially scattering the sensing beam to the feedback beam direction and substantially scrambling the phase of the feedback beam, constructing interferometer signal for the interferometer signal-processing device to process at least 10 consecutive target-illuminated signal cycles.

4. The apparatus of claim 3 is further configured for optical coherence tomography.

5. An apparatus for transversely step scanning an interferometer sensing beam by combining continuous scanning and repetitive counter-scanning comprising:

a light source;

a beamsplitter splitting the light source into a reference beam and a sensing beam;

a first beam-moving device moving the sensing beam transversely;

a second beam-moving device moving the sensing beam in the same plane of the first beam moving;

a transmitting aperture transmitting the sensing beam out of the apparatus and projecting a beam spot at a target location, with a resolvable beam width along the beam-moving direction;

a receiving aperture collecting a feedback beam from the target location;

a beam-combining device combining at least a portion of the reference beam and at least a portion of the feedback beam to form an interferometer signal;

a motion-controlling function programming the first beam-moving device to scan the sensing beam continuously along a beam-scanning direction, and programming the second beam-moving device repetitively to move the sensing beam in the opposite direction of the beam-scanning direction in periods of low beam-moving speed and to move the sensing beam along the same direction of beam-scanning direction in periods of high beam-moving speed.

6. The apparatus of claim 5 wherein said second beam-moving device comprises an acoustic optical deflector.

7. The apparatus of claim 6 further comprises a device to shift the optical frequency of wherein said reference beam to compensate the optical frequency shift of the sensing beam caused by wherein said acoustic optical deflector.

8. The apparatus of claim 5, where the apparatus further comprises:

a signal acquisition device acquiring the interferometer signal;

an interferometer controlling function synchronizing beam-moving actions and signal acquisition cycles such that the signal acquisition device repetitively acquiring the interferometer signal during the periods of low beam-moving speed;

an interferometer signal-processing device processing a period of acquired interferometer signal and producing a set of interferometer measurements, repeating the data processing for multiple acquired periods of signal, mapping multiple beam locations with corresponding interferometer measurements;

a target comprising a substantially scattering area at the target location, being illuminated by the sensing beam, substantially scattering the sensing beam to the feedback beam direction and substantially scrambling the phase of the feedback beam, constructing interferometer signal for the interferometer signal-processing device to process multiple target-illuminated signal cycles.

9. An apparatus of step scanning a chirped laser beam by combining continuous scanning and dispersive counter-scanning comprising:

a light source comprising a first chirped laser component, continuously changing the laser wavelength and resetting the wavelength to complete a chirp cycle, and repeating multiple chirp cycles;

a first sensing laser beam consisting of at least a portion of the first chirped laser component;

a first dispersive component dispersing the first sensing laser beam, and creating a first reciprocating dispersive beam moving due to the wavelength chirping and resetting;

a beam-scanning device;

a beam-scanning function programming the beam-scanning device to transversely scanning the first sensing laser beam continuously along a direction reversing the dispersive moving direction during the chirp periods.

10. The apparatus of claim 9 further comprises a laser chirping function to program the laser chirp substantially linear.

11. The apparatus of claim 10 wherein said beam-scanning function further programs wherein said beam-scanning device to operate at a substantially constant speed, such that the dispersive beam moving substantially cancels the sensing-beaming displacement during chirp periods.

12. The apparatus of claim 10 wherein said beam-scanning function further programs the dispersive beam displacement within 0.2 to 2.0 times the beam width at a beam location.

13. The apparatus of claim 9 wherein said first dispersive component and wherein said beam-scanning device is an integrated device.

14. The apparatus of claim 9 is configured as an interferometer and further comprises:
- a first beamsplitter splitting wherein said first chirped laser component, with the output beams comprising a first reference laser beam and wherein said first sensing laser beam;
- a transmitting aperture transmitting the first sensing laser beam out of the apparatus after the dispersive beam moving and the beam scanning, and projecting a beam spot at a target location;
- a first receiving aperture collecting a first feedback beam from the target location;
- a first beam combining device combining at least a portion of the first reference laser beam and at least a portion of the first feedback beam to form a first interferometer signal.

15. The apparatus of claim 14 further comprising:
- a target comprising a substantially scattering area at the target location, being illuminated by the first sensing laser beam, substantially scattering the first sensing laser beam to the first feedback beam direction and substantially scrambling the phase of the first feedback beam.

16. The apparatus of claim 15 is further configured for optical coherence tomography.

17. The apparatus of claim 14 further comprises:
- a second chirped laser component, simultaneously and repetitively chirping and resetting wavelength along with the first chirped laser component, with opposite chirping directions between the two laser components,
- a second beamsplitter splitting the second chirped laser component, with the output beams comprising a second reference laser beam and a second sensing laser beam;
- a second dispersive component dispersing the second sensing laser beam, creating a second reciprocating dispersive beam moving;
- a second beam combining device merging at least a portion of the second sensing laser beam into the first sensing laser beam, and substantially overlapping the second reciprocating dispersive beam moving with the first reciprocating dispersive beam moving, and directing the merged sensing laser beam to wherein said beam-scanning device;
- a second receiving aperture collecting a second feedback beam from the target location;
- a third beam combining device combining at least a portion of the second reference beam and at least a portion of the second feedback beam to form a second interferometer signal.

18. The apparatus of claim 17 wherein said second beam-combining device is a polarization beamsplitter, and the said first sensing laser beam and the second sensing laser beam are substantially polarized to support the said merging with a high optical efficiency.

19. The apparatus of claim 17 wherein said first chirped laser component and second chirped laser component have a common mean wavelength, and wherein said first receiving aperture and second receiving aperture are one common receiving aperture.

20. The apparatus of claim 17 wherein said the first interferometer signal and the second interferometer signal are processed to produce measurements comprising Doppler shift.

* * * * *